(12) United States Patent
Cannell

(10) Patent No.: US 6,519,383 B1
(45) Date of Patent: Feb. 11, 2003

(54) PHOTONIC SWITCH STATUS TESTER

(75) Inventor: George J Cannell, Bishop's Stortford (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/724,454

(22) Filed: Nov. 28, 2000

(51) Int. Cl.[7] .............................. G02B 6/12; G02B 6/26
(52) U.S. Cl. ...................................................... 385/18
(58) Field of Search ................................ 385/18, 17

(56) References Cited

U.S. PATENT DOCUMENTS

| | | | | |
|---|---|---|---|---|
| 6,160,928 A | * | 12/2000 | Schroeder | 385/18 |
| 6,198,856 B1 | * | 3/2001 | Schroeder et al. | 385/17 |
| 6,243,511 B1 | * | 6/2001 | Laughlin | 385/18 |
| 6,248,539 B1 | * | 6/2001 | Ghadiri et al. | 385/12 |
| 6,268,125 B1 | * | 7/2001 | Perkins | 385/12 |
| 6,278,812 B1 | * | 8/2001 | Lin et al. | 385/18 |
| 6,312,961 B1 | * | 11/2001 | Voirin et al. | 385/12 |

OTHER PUBLICATIONS

U.S. patent application Ser. No. 09/545,545, Cannell, filed Apr. 7, 2000.

"Free–Space Micromachined Optical Switches for Optical Networking" by L Y Lin et al, IEEE Journal of Selected Topics in Quantum Electronics, vol. 5 No. 1, Jan./Feb. 1999.

"Free–Space Micromachined Optical–Switching Technologies and Architectures" by L Y Lin, OFC 1999.

* cited by examiner

Primary Examiner—Lynn D. Feild
Assistant Examiner—Hae Moon Hyeon
(74) Attorney, Agent, or Firm—Lee, Mann, Smith, McWilliams, Sweeney & Ohlson

(57) ABSTRACT

A method and apparatus suitable for testing the operation of a photonic switch are described. The photonic switch includes switching means arranged to redirect (and hence switch) an incident optical signal. Operation of the switching means can be verified by providing a test optical signal arranged to be incident upon the switching means, the test optical signal path being distinct from the switched optical signal path.

14 Claims, 4 Drawing Sheets

Flat (inactivated)

Upright (activated)

PHOTONIC SWITCH STATUS TESTER

FIELD OF THE INVENTION

The present invention relates to a photonic switch, and in particular to an apparatus and a method suitable for testing the operation of a photonic switch.

BACKGROUND OF THE INVENTION

Communications networks are increasingly becoming all optical networks, incorporating photonic (optical) switching. Photonic switches are typically fabricated using Micro Electro-Mechanical Structures (MEMS) technology. A recently developed photonic switch of this type is described in "Free-Space Micro Machined Optical Switches for Optical Networking" by LY Lin et al, IEEE Journal of Selected Topics in Quantum Electronics, Vol. 5 No. 1, January/February 1999; which is incorporated herein by reference. Such switches may be used to switch wavelength division multiplexed (WDM) signals as a group, or the WDM signals may be demultiplexed outside the switch and switched individually as channels, or as groups of channels as desired. MEMS switches typically use moveable mirrors to re-direct optical paths within the switch in order to complete an optical signal or channel connection across the switch.

FIG. 1 shows a schematic diagram of a typical MEMS photonic switch 100. The switch 100 is bidirectional, but for simplicity is assumed to comprise 4 inputs in the form of optical fibres 112, 114, 116 & 118, and 4 outputs which are also optical fibres 122, 124, 126 & 128. Each input and output has an associated lens 104 which collimates the beam from each input and focuses the respective beam at each output. Such a switch is generically referred to as a 4×4 switch (number of inputs x number of outputs).

The switch 100 is a cross point switch, having a switching device (a mirror, 106) located at each of the points at which optical signals emitted from the input fibres would cross with optical signals emitted from the output fibres. The switch 100 thus has a four by four array of mirrors 106 mounted on a surface 102.

In this particular switch, each mirror may be moved between two stable positions. FIGS. 2a and 2b illustrate these positions. FIG. 2a shows the mirror in the inactivated position 106a, where the mirror is flat i.e. substantially parallel to the surface 102. FIG. 2b shows the mirror having been raised to the activated or upright position 106b, substantially perpendicular to the surface 102. This activation may be performed by a variety of means e.g. by micro actuators causing the mirror to be rotated about the hinges 108. The mirrors are typically formed of materials such as polysilicon, the reflectivity of which is increased by providing a reflective coating 107 such as gold. In the inactivated state, it is typical for the relatively non reflective surface 109 of the mirror to lie adjacent to the surface 102, so that the reflective coating 107 does not contact the surface 102.

FIG. 1 shows a typical operation of the switch 100. By raising the appropriate mirrors, an optical signal from each of the inputs 112, 114, 116 & 118 is directed to a respective output 128, 126, 122 & 124. For instance, an optical signal originating from input fibre 112 is formed into a collimated beam 132 by lens 104. The beam 132 then reflects off the front reflective surface 107 of a raised mirror 106b into a further lens 104 which focuses the beam 132 into the output fibre 128. It will be appreciated that by appropriate control of the array of mirrors 106, any one of the signals originating from the inputs 112, 114, 116 & 118 can be switched into any one of the outputs, 122, 124,126 & 128.

Various solutions have been proposed to test the mirror status or switch connection, in order to verify that the mirrors 106 are functioning correctly and are not, for example, jammed in either the raised 106b or flat 106a position.

One solution is to inject different optical test signals into each input port (i.e. 112, 114, 116, 118) to the switch 100 via fibre tap couplers (not shown). Such test signals would be distinct from the normal optical signal being switched e.g. of different wave length and/or modulation characteristics. Each output port (i.e. 122, 124, 126, 128) would then be connected to a further tap coupler, in order that the test signals could be extracted, detected and analysed for verification that the desired input to output connections exist. This solution is true connectivity verification. However, due to the number of components required, it would be both bulky and expensive. For instance, in a N×N switch (where N is an integer) the required components would include 2N couplers, N sources, N detectors, as well as numerous splices and fibre interfaces; additionally there would be the assembly cost.

An alternative solution is to use electrical parameters (e.g. capacitance, inductance or resistance) to monitor the physical position of the mirrors. However, this would double the number of electrical connections to the switch matrix, and is hence impractical for large arrays of mirrors.

Co-pending U.S. application Ser. No. 09/545,545, "Testing Operation of a Photonic Switch", by the same inventor, describes a method of utilising test optical signals in the plane of the switching mirrors, reflected from the rear of one or more of the mirrors, in order to test whether the mirrors are functioning correctly. This approach has limitations in that it requires the rear of the mirrors to be reflective, and requires an array of mirrors to be in certain predefined configurations for any given mirror to be tested. Simultaneous testing of all mirrors is hence not possible.

The present invention aims to address one or more of the problems of the prior art.

SUMMARY OF THE INVENTION

In a first aspect, the present invention provides a photonic switch having at least one switching means comprising a reflective surface arranged to be moveable between at least a first and a second position, and arranged to switch an incident optical signal by reflectively redirecting the optical path of said signal when in at least one of said positions, the incident and redirected optical paths defining a first plane; the switch further comprising test signal means arranged to provide a test optical signal incident said reflective surface, and measuring means arranged to measure a reflection of the test signal at a predetermined position suitable for determining if said switching means is in said first position from said measurement, the paths of the incident and reflected test signals lying outside of the first plane.

In a further aspect, the present invention provides a telecommunications system comprising a photonic switch having at least one switching means comprising a reflective surface arranged to be moveable between at least a first and a second position, and arranged to switch an incident optical signal by reflectively redirecting the optical path of said signal when in at least one of said positions, the incident and redirected optical path defining a first plane; the switch further comprising test signal means arranged to provide a test optical signal incident said reflective surface, and measuring means arranged to measure a reflection of the test signal at a predetermined position suitable for determining if said switching means is in said first position from said measurement, the paths of the incident and reflected test signals lying outside of the first plane.

In another aspect, the present invention provides a method of testing the status of a photonic switch, the switch having at least one switching means comprising a reflective surface arranged to be moveable between at least a first and a second position, and arranged to switch an incident optical signal by reflectively redirecting the optical path of said signal when in at least one of said positions, the incident and redirected optical paths defining a first plane; the method comprising the steps of providing a test optical signal incident said reflective surface, the optical path of the test signal not lying within said first plane, and measuring a reflection of the test signal at a predetermined position suitable for determining if said switching means is in said first position from said measurement.

Preferably, the method further comprises the step of providing an actuating signal sufficient to move the switching means such that the intensity of the reflected test signal at the predetermined measuring location would be altered, without moving the switching means sufficiently to redirect the incident optical signal. This allows the switching means (normally mirrors) to undergo a small movement to check whether the mirror is stuck, but without the movement being large enough so as to redirect the incident optical signal. If the mirrors move in response to the actuating signal, then this can be detected by the change in reflected test signal incident on the detector. This test allows re-routing to an alternative path if the mirror is fixed in position.

In a further aspect, the present invention provides a computer program arranged to perform a method of testing the status of a photonic switch, the switch having at least one switching means comprising a reflective surface arranged to be moveable between at least a first and a second position, and arranged to switch an incident optical signal by reflectively redirecting the optical path of said signal when in at least one of said positions, the incident and redirected optical paths defining a first plane; the method comprising the steps of providing a test optical signal incident said reflective surface, the optical path of the test signal not lying within said first plane, and measuring a reflection of the test signal at a predetermined position suitable for determining if said switching means is in said first position from said measurement.

BRIEF DESCRIPTION OF THE DRAWINGS

In order that a greater understanding of the invention can be obtained, embodiments of the invention will now be described with reference to the accompanying drawings, by way of example only and without intending to be limiting, in which.

DETAILED DESCRIPTION OF PREFERRED EMBODIMENTS

Figure 1:
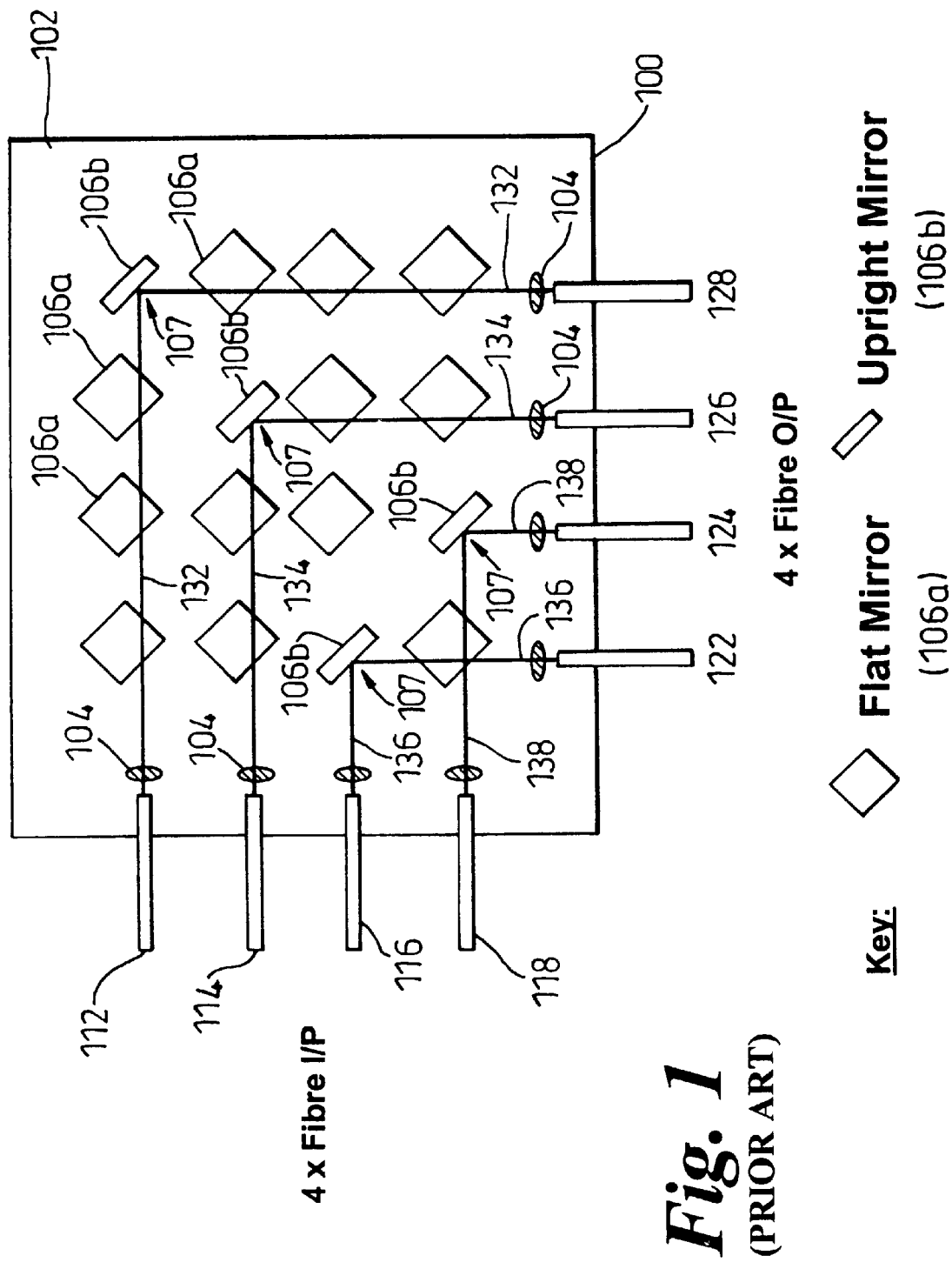
FIG. 1 shows a typical MEMS switch arrangement (PRIOR ART)
Figures 2A, 2B:
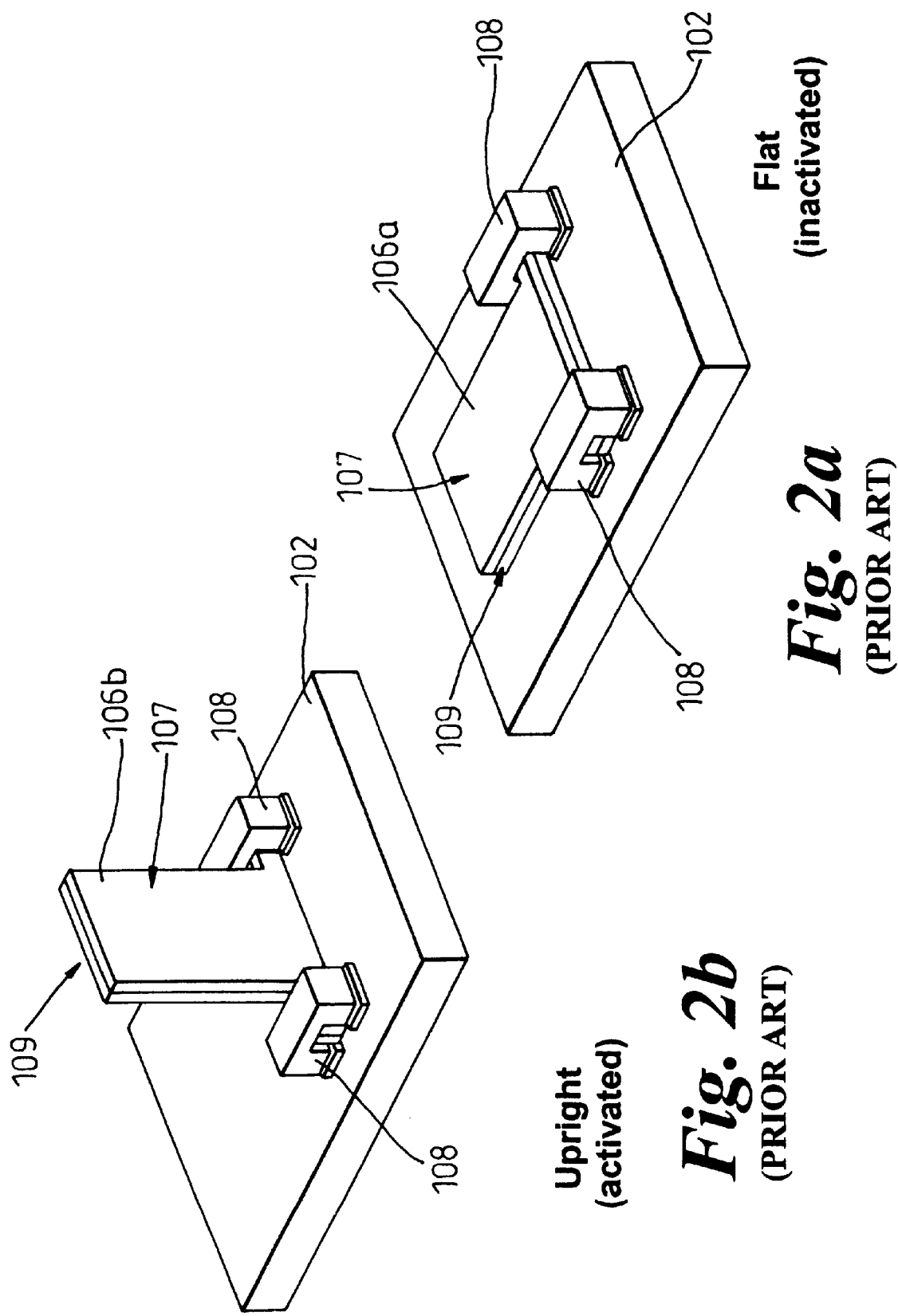
FIG. 2a and FIG. 2b show respectively a mirror from the switch of FIG. 1 in the inactivated state and the activated state (PRIOR ART)
Figure 3:
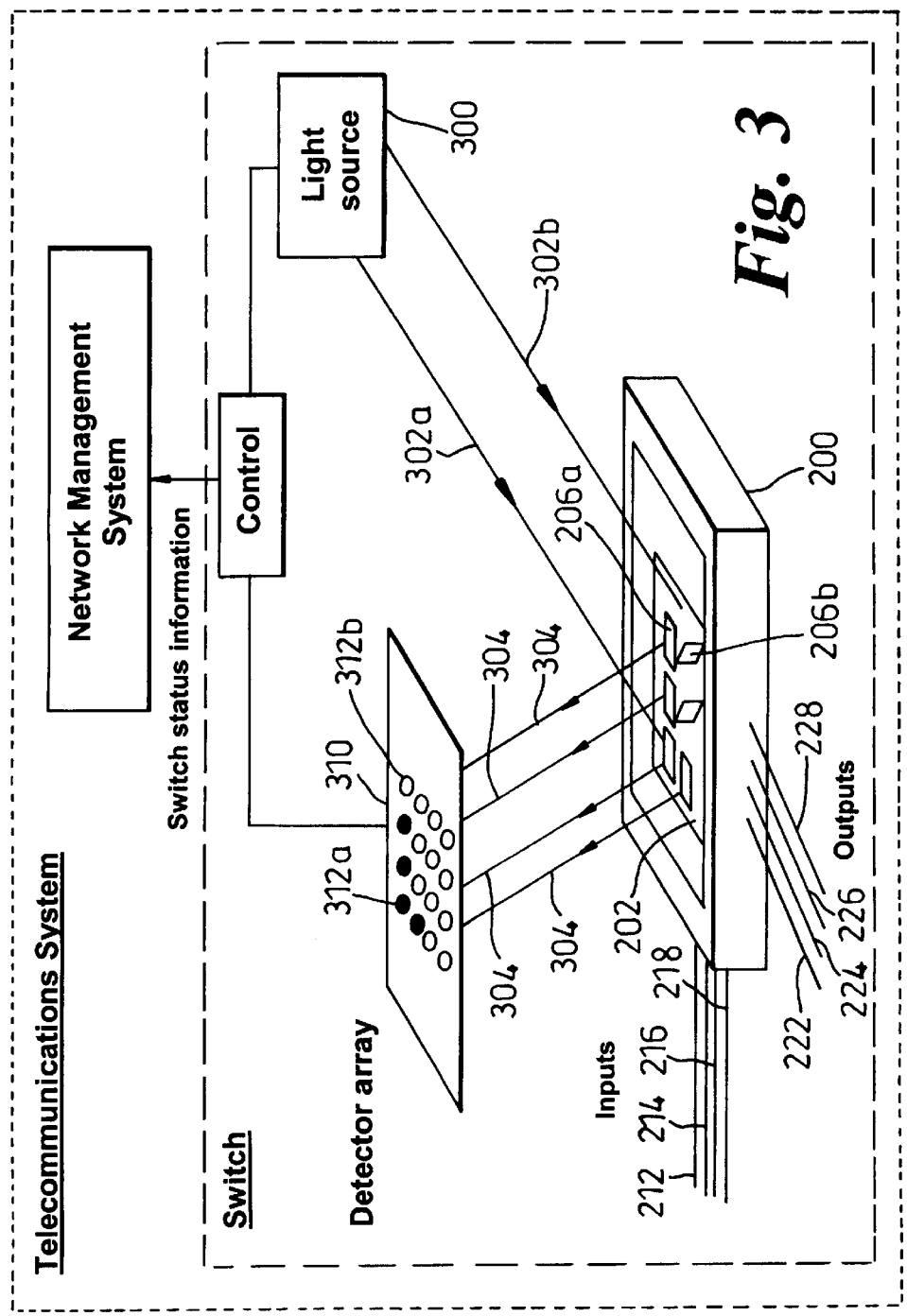
FIG. 3 shows the testing of a MEMS switch according to a first embodiment of the present invention.

FIG. 3 shows a first embodiment of the present invention, which largely corresponds to the typical MEMS switch arrangement found in FIG. 1. By appropriate movement of each of the mirrors 206 between the flat 206a and raised 206b positions, optical signals from each of the inputs 212, 214, 216 and 218 can be directed to any of the outputs 222, 224, 226 and 228. The apparatus is characterised by having a light source 300 arranged to transmit light so as to be incident upon the array of mirrors 206.

A detector array 310 comprises an array of photo detectors 312, with a respective photo detector 312 for each of the mirrors 206. The detector array 310 is arranged such that each photo detector 312 will detect light from the respective mirror 206 when the mirror is in the flat (inactivated) position 206a.

FIG. 3 shows this particular embodiment in use. From the perspective view of the switch 200 shown, it can be seen that two of the mirrors 206 are in the upright position 206b with four of the mirrors 206 in the flat position 206a i.e. substantially parallel to the switch surface 202. Optical signals from the inputs (212–218) will thus be switched via the mirrors 206b to the outputs (222–228), with the signals lying within the same plane. This plane will be substantially parallel and, in the orientation illustrated, above the plane defined by the surface 202.

The light source is positioned above the plane of the signals, and arranged to provide a beam of light 302 (the outer extremities of the beam 302a and 302b are shown) that intersects the plane of the switched optical signals. Only light incident upon the flat mirrors 206a will be reflected 304 so as to illuminate a photo detector 312.

Analysis of the signals of the photo detectors to determine those that are illuminated (312a) and those that are not illuminated (312b) can respectively determine which of the mirrors are in the flat position and which are not.

The embodiment thus allows the detection of mirror status (i.e. position and operation) with components positioned outside of the plane of the switched optical signals. Thus the detection system does not interfere in any way with the mirrors, the inputs and outputs or any expansion ports that may exist for control of the mirrors. As this detection technique does not rely on light from the inputs (212–218) or outputs (222–228), no optical couplers are required that would result in an attenuation of the optical signal being switched or added complication or cost.

If desired, the detection can be performed at a relatively low speed, thus allowing for large area detectors which minimise the precision of the geometry of the optics required in relation to the light source 300 and the detector array 310. Only one light source 300 is necessary, although of course it will be appreciated that if desired a separate light source could be utilised for providing a respective signal 302 incident upon each mirror 206.

The light source can be of any desired wavelength, but is preferably of a different wavelength than the optical signals being switched so as to reduce interference. Preferably, the light source is visible radiation, thus permitting the use of relatively inexpensive silicon detector arrays. Finally, as the technique preferably utilises the existing high reflectivity front surface of the mirrors 206, no extra steps in MEMS processing is required to construct the apparatus of the present invention.

If desired, a window transparent to the light from the light source 300 could be used to hermetically seal the upper surface of the switch 200. Such a window (not shown) could be positioned so as to be substantially parallel to the surface 202. Suitable materials for such window would include sapphire or glass, which are transparent to the visible wavelengths of light.

The invention thus provides a practical and low cost means of continuously monitoring the status of the mirrors in a MEMS optical switch. The network manager in a optical transmission system can utilise this information to identify faults in the switching and mirrors, and to infer the input/output connectivity of that element. If a fault is detected in the switch, then the network manager can appropriately reroute signals around the switch/network so as to minimise the impact of the fault on live traffic.

As well as being utilised on-line (i.e. when the system is carrying live optical signals), the method may also be used to test the operation of the mirrors off-line.

If desired, the invention can also be utilised to provide a means of testing on-line the operation of the mirrors 206 to ensure that they have not become stuck in, for instance, the flat 206a position, prior to actuating the mirrors into the raised 206b position. This is achieved by applying a low level of actuating signal to a mirror in the flat position 206a, sufficient to move the mirror such that the reflected light from the mirror does not fall on the respective detector at the same level of intensity. As the mirror is only moved through a relatively small angle, the optical signals being switched will not be interrupted/affected, whilst a change in detected light intensity will indicate that the mirror 206 is not stuck.

Whilst the invention has been described in reference to the particular embodiments shown in FIG. 3, equally it will be understood by a skilled person that various other embodiments will fall within the scope of the present invention. For instance, whilst the detector 310 has been described as a detector array, it will be appreciated that this array could be replaced by a single detector having a surface area sufficient to detect all the optical signals reflected from all of the mirrors in the flat position 206a. The mirror status could thus be deduced by determining the total optical power incident upon the detector array compared with the optical power which would be reflected by a single mirror in the flat position 206a.

Equally, whilst the invention has been described in relation to monitoring when the mirrors 206 are in the flat position, it will be appreciated that the technique described in principle could be extended to confirm angular positions of the mirrors at any desired angle. This could be achieved by appropriate positioning of the light source 300 and detector 310.

Figure 4:
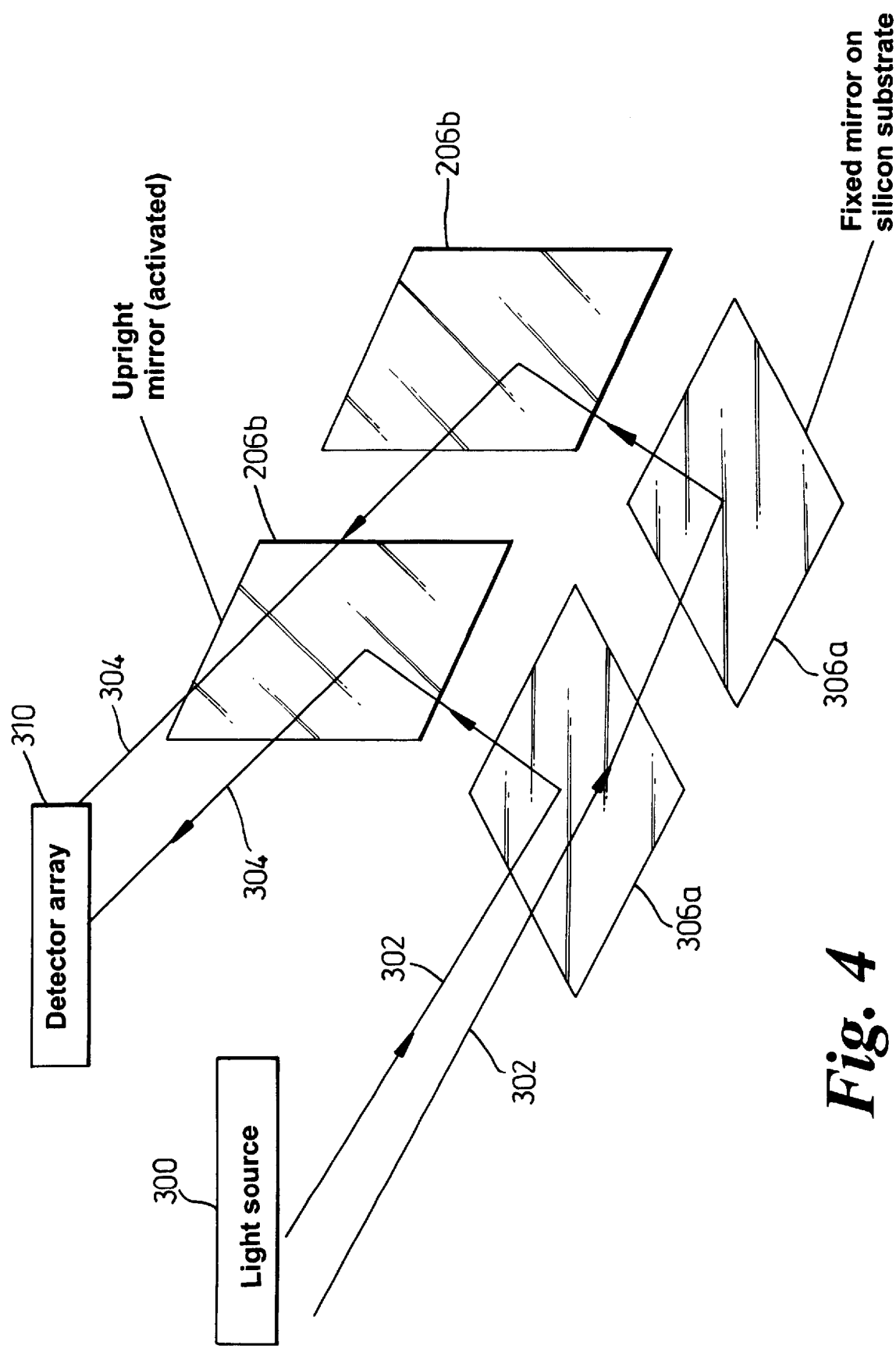
FIG. 4 shows the testing of a MEMS switch according to a second embodiment of the present invention.

FIG. 4 shows such an alternative embodiment. In this particular embodiment, additional mirrors (306a) are located adjacent to the switch mirrors 206. In this instance, the additional mirrors 306a are fixed in position so as to lie substantially flat upon the silicon substrate surface 202. The light source 300, additional mirrors 306a and the detector array 310 are positioned such that an optical signal 302 from the light source 300 will be detected at the respective detector in the array 310, with the beam 302 being reflected from the fixed mirror 306a and the actuated mirror 206 only when in the upright position 206b. If the respective actuated mirror 206 is in the flat position 206a, then the reflected light beam 304 will not be incident upon the respective detector within the array 310.

It will be appreciated that in the embodiment shown in FIG. 4, the light source and the detector array positions could be juxtaposed due to the bi-directional nature of light.

Equally, if desired the embodiment shown in FIG. 3 and the embodiment shown in FIG. 4 could be combined into a single apparatus, utilising only a single light source 300 but two arrays of detectors 310 respectfully arranged to detect when the mirrors are in the flat position 206a or the upright position 206b.

For the purpose of this specification the terms "optical" and "light" should be understood as pertaining not only to the visible part of the electro magnetic spectrum, but also to the infra-red and ultra-violet parts that bound the visible part.

Any range as given herein may be extended or altered without loosing the effect sought, as will be apparent to a skilled person from an understanding of the teaching herein.

What is claimed is:

1. A photonic switch having at least one switching means comprising a reflective surface arranged to be moveable between at least a first and a second position, and arranged to switch an incident optical signal by reflectively redirecting the optical path of said signal when in at least one of said positions, the incident and redirected optical paths defining a first plane;

the switch further comprising test signal means arranged to provide a test optical signal incident said reflective surface, and measuring means arranged to measure a reflection of the test signal at a predetermined position suitable for determining if said switching means is in said first position from said measurement, the paths of the incident and reflected test signals lying outside of the first plane.

2. A switch as claimed in claim 1, wherein the test signal means is arranged such that the paths of the incident and reflected test signals intersect said first plane.

3. A switch as claimed in claim 1, wherein said first position is when said reflective surface is substantially parallel to said first plane.

4. A switch as claimed in claim 1, further comprising a further reflective surface arranged such that the test optical signal can undergo reflections from both reflective surfaces prior to being measured by said measuring means.

5. A switch as claimed in claim 1, further comprising control means arranged to control the operation of the test signalling means and the measuring means so as to provide information regarding the status of the switch.

6. A switch as claimed in claim 5, wherein said control means is further arranged to provide a signal if it is detected that one of the switching means is not functioning correctly, provision of the signal resulting in at least one of the switches being reconfigured and optical signals being redirected from the optical switch to an alternative optical path.

7. A telecommunications system comprising a photonic switch having at least one switching means comprising a reflective surface arranged to be moveable between at least a first and a second position, and arranged to switch an incident optical signal by reflectively redirecting the optical path of said signal when in at least one of said positions, the incident and redirected optical path defining a first plane;

the switch further comprising test signal means arranged to provide a test optical signal incident said reflective surface, and measuring means arranged to measure a reflection of the test signal at a predetermined position suitable for determining if said switching means is in said first position from said measurement, the paths of the incident and reflected test signals lying outside of the first plane.

8. A telecommunications system as claimed in claim 7, the system further comprising a network management system arranged to manage the operation of the telecommunications system, wherein the switch is further arranged so as to provide a signal to the network management system indicative of the determined status of the switching means.

9. A method of testing the status of a photonic switch, the switch having at least one switching means comprising a reflective surface arranged to be moveable between at least a first and a second position, and arranged to switch an incident optical signal by reflectively redirecting the optical path of said signal when in at least one of said positions, the incident and redirected optical paths defining a first plane;

the method comprising the steps of
providing a test optical signal incident said reflective surface, the optical path of the test signal not lying within said first plane, and
measuring a reflection of the test signal at a predetermined position suitable for determining if said switching means is in said first position from said measurement.

10. A method as claimed in claim 9, further including the step of the switching means, when in said first position, reflecting the test optical signal.

11. A method as claimed in claim 9, wherein said switch comprises a plurality of said switching means, the method steps being simultaneously performed in respect of each switching means.

12. A method as claimed in claim 9, the method further comprising the step of providing an actuating signal sufficient to move the switching means such that the intensity of the reflected test signal at the predetermined measuring location would be altered, without moving the switching means sufficient to redirect the incident optical signal.

13. A computer program arranged to perform a method of testing the status of a photonic switch, the switch having at least one switching means comprising a reflective surface arranged to be moveable between at least a first position and a second position, and arranged to switch an incident optical signal by reflectively redirecting the optical path of said signal when in at least one of said positions, the incident and redirected optical paths defining a first plane;

the switch further comprising test signal means arranged to provide a test optical signal incident said reflective surface, and
measuring means arranged to measure a reflection of the test signal at a predetermined position suitable for determining if said switching means is in said first position from said measurement, the paths of the incident and reflected test signals lying outside of the first plane.

14. A computer program according to claim 13, wherein said computer program is stored on a machine readable medium.

* * * * *